(12) United States Patent
Bienvenu et al.

(10) Patent No.: US 9,789,556 B2
(45) Date of Patent: Oct. 17, 2017

(54) BRAZING WITHOUT TOOLS

(71) Applicant: AIRCELLE, Gonfreville l'Orcher (FR)

(72) Inventors: Philippe Bienvenu, Montivilliers (FR); Helene Malot, Sainte Adresse (FR); Francisco Caneque, Evreux (FR)

(73) Assignee: AIRCELLE, Gonfreville l'Orcher (FR)

( * ) Notice: Subject to any disclaimer, the term of this patent is extended or adjusted under 35 U.S.C. 154(b) by 0 days.

(21) Appl. No.: 14/883,994

(22) Filed: Oct. 15, 2015

(65) Prior Publication Data

US 2016/0031032 A1 Feb. 4, 2016

Related U.S. Application Data

(63) Continuation of application No. PCT/FR2014/050915, filed on Apr. 15, 2014.

(51) Int. Cl.
*B23K 31/02* (2006.01)
*B23K 3/08* (2006.01)
(Continued)

(52) U.S. Cl.
CPC ............ *B23K 3/087* (2013.01); *B21D 26/033* (2013.01); *B23K 1/008* (2013.01); *B23K 1/0018* (2013.01);
(Continued)

(58) Field of Classification Search
CPC ...... B23K 3/087; B23K 1/008; B23K 1/0018; B23K 2201/001; B23K 1/0012;
(Continued)

(56) References Cited

U.S. PATENT DOCUMENTS 2,137,097 A * 11/1938 Sateren ................ B23K 11/002
219/107
3,001,274 A * 9/1961 Price .................... B23K 1/0014
228/181
(Continued)

FOREIGN PATENT DOCUMENTS

JP        55086691 A  *  6/1980
JP        60037263 A  *  2/1985  ............... B23K 1/18
(Continued)

OTHER PUBLICATIONS

International Search Report issued Oct. 22, 2014 in International Application No. PCT/FR2014/050915.

*Primary Examiner* — Kiley Stoner
(74) *Attorney, Agent, or Firm* — Burris Law, PLLC

(57) ABSTRACT

A method for assembling a set including an inner wall, a shrouded outer wall and an intermediate element, each presenting substantially circular sections, the shrouded outer wall presenting a shape substantially complementary to a shape of outer and inner surfaces of the intermediate element, and whose inner surface covers the outer surface of the intermediate element. In particular, the method includes a step of placing a brazing sheet, whose melting temperature is lower than melting temperatures of other elements of the set, over an assembly surface in contact with another assembly surface, and a step of heating, by a furnace, a set including the outer or inner walls and the intermediate element between which is interposed a brazing sheet so as to fix the outer or inner wall by brazing on the intermediate element.

7 Claims, 1 Drawing Sheet

(51) Int. Cl.
*B21D 26/033* (2011.01)
*B23K 1/008* (2006.01)
*F02K 1/82* (2006.01)
*F02K 1/80* (2006.01)
*B23K 1/00* (2006.01)
*B23K 101/00* (2006.01)

(52) U.S. Cl.
CPC ............... *F02K 1/80* (2013.01); *F02K 1/827* (2013.01); *B23K 1/0014* (2013.01); *B23K 2201/001* (2013.01); *F05D 2230/23* (2013.01); *F05D 2230/237* (2013.01); *F05D 2250/283* (2013.01); *F05D 2300/502* (2013.01)

(58) Field of Classification Search
CPC .......... B23K 1/0014; B23K 2201/02–2201/08; B23K 2201/14; F02K 1/80; F02K 1/827; B21D 26/033; F05D 2230/237; F05D 2300/502; F05D 2250/283; F05D 2230/23
USPC ........... 228/181, 183, 245–255, 173.1, 173.4
See application file for complete search history.

(56) References Cited

U.S. PATENT DOCUMENTS

| | | | | |
|---|---|---|---|---|
| 3,011,254 A | * | 12/1961 | Melill | B23K 1/0014 228/181 |
| 3,011,255 A | * | 12/1961 | Washburn | B23K 11/02 228/125 |
| 3,025,596 A | * | 3/1962 | Ward | B23K 20/08 228/107 |
| 3,072,225 A | * | 1/1963 | Long | B21D 47/00 156/197 |
| 3,110,961 A | * | 11/1963 | Melill | B23K 1/0014 228/106 |
| 3,173,813 A | * | 3/1965 | Dewey | B23K 1/0014 148/517 |
| 3,217,392 A | * | 11/1965 | Roffelsen | B21C 37/22 165/184 |
| 3,910,039 A | * | 10/1975 | Fortini | F02K 9/64 239/127.3 |
| 4,137,992 A | | 2/1979 | Herman | |
| 4,368,776 A | * | 1/1983 | Negita | F28D 1/05333 165/133 |
| 4,498,220 A | * | 2/1985 | Fiegen | B21D 22/125 29/421.1 |
| 4,515,305 A | * | 5/1985 | Hagemeister | B21D 39/06 228/173.2 |
| 4,620,662 A | * | 11/1986 | Driggers | B23K 1/18 228/126 |
| 4,746,054 A | * | 5/1988 | Moats | B23K 1/18 227/122 |
| 4,783,890 A | * | 11/1988 | Gaudin | B23K 9/0288 29/402.09 |
| 4,847,967 A | * | 7/1989 | Gaudin | B21D 39/04 138/98 |
| 4,886,203 A | * | 12/1989 | Puzrin | B23K 1/18 138/142 |
| 5,071,174 A | * | 12/1991 | Griffin | F16L 41/084 228/251 |
| 5,233,755 A | * | 8/1993 | Vandendriessche | F02K 9/64 29/890.01 |
| 5,386,628 A | | 2/1995 | Hartman et al. | |
| 5,520,223 A | * | 5/1996 | Iorio | B29C 63/486 138/137 |
| 5,702,050 A | * | 12/1997 | Oono | B23K 1/0014 228/181 |
| 6,151,940 A | * | 11/2000 | Amborn | B21D 26/053 72/61 |
| 6,237,382 B1 | * | 5/2001 | Kojima | B21D 22/025 29/421.1 |
| 6,926,069 B1 | * | 8/2005 | Roffelsen | B23K 1/0012 165/154 |
| 2001/0013533 A1 | * | 8/2001 | Ohnishi | B21C 37/0811 228/116 |
| 2002/0003159 A1 | * | 1/2002 | Gabbianelli | B21C 37/154 228/131 |
| 2002/0005223 A1 | * | 1/2002 | Campagna | F16L 9/147 138/146 |
| 2004/0103638 A1 | * | 6/2004 | Hagganger | F02K 9/64 60/267 |
| 2006/0213182 A1 | * | 9/2006 | Fint | F02K 9/97 60/266 |
| 2007/0158312 A1 | * | 7/2007 | Wang | B23K 1/0004 219/59.1 |
| 2008/0178650 A1 | * | 7/2008 | Tomizawa | B21D 26/033 72/61 |
| 2009/0019857 A1 | * | 1/2009 | Tisdale | F02K 1/386 60/770 |
| 2011/0114216 A1 | * | 5/2011 | Blueml | B23K 1/002 138/155 |
| 2012/0131903 A1 | * | 5/2012 | Dobek | F02K 9/50 60/257 |
| 2012/0247741 A1 | * | 10/2012 | Okamoto | B23K 1/0012 165/170 |
| 2014/0158333 A1 | * | 6/2014 | Kim | B23P 15/26 165/181 |
| 2015/0090774 A1 | * | 4/2015 | Nishikawa | B23K 1/19 228/203 |
| 2015/0136841 A1 | * | 5/2015 | Bienvenu | B23K 1/0018 228/173.6 |
| 2016/0031027 A1 | * | 2/2016 | Chu | B23K 1/0014 228/245 |
| 2016/0107252 A1 | * | 4/2016 | Betz | B23K 20/026 228/248.1 |

FOREIGN PATENT DOCUMENTS

| JP | 94019083 B2 | * | 10/1987 |
| JP | 2010064099 A | * | 3/2010 |
| JP | 2013176779 A | * | 9/2013 |
| WO | 03/092946 A1 | | 11/2003 |

* cited by examiner

BRAZING WITHOUT TOOLS

CROSS-REFERENCE TO RELATED APPLICATIONS

This application is a continuation of International Application No. PCT/FR 2014/050915, filed on Apr. 15, 2014, which claims the benefit of FR 13/53392, filed on Apr. 15, 2013. The disclosures of the above applications are incorporated herein by reference.

FIELD

The present disclosure relates to turbojet engine nacelles, and more specifically, a device for assembling parts to be brazed.

BACKGROUND

The statements in this section merely provide background information related to the present disclosure and may not constitute prior art.

There is known, from the prior art, a metal brazing tooling using the principle of thermal expansion, which cannot be applied in this instance, because of the high thermal expansion coefficient of Inconel 625.

It is also known, from the prior art, a brazing tooling using gas pressurization. Such a device comprises a central cylindrical drum constituting the gas chamber, contained in a counter-shape on which is fixed by screwing a sealing device constituted by upper and lower flanges. The pressure is applied on a cylindrical inner skin, thereby pressing said skin against a honeycomb structure, and then the set constituted by the inner skin and by the honeycomb structure against an outer skin. Afterwards, the inner skin/honeycomb structure/outer skin cylindrical set, is deformed under the effect of pressure until meeting the counter-shape whose inner surface adopts the desired final shape.

Such devices present drawbacks, in particular in that the use of a metal brazing tooling is expensive, not only per se, but also in terms of maintenance, and implies furthermore an additional cost of the thermal cycle related to the inertia of the tooling; the use of a brazing tooling by gas pressure presents in particular the drawback of implying an additional cost for achieving gas tightness, as well as technical difficulties such as mastering the parameters of pressure, time and temperature in order to avoid crushing of the honeycomb and to improve the marking phenomenon of the honeycomb (telegraphing) on the skin.

SUMMARY

The present disclosure provides a method for assembling a set comprising an inner wall, a shrouded outer wall and an intermediate element, each presenting substantially circular sections, the outer wall presenting a shape substantially complementary to the shape of the outer and inner surfaces of the intermediate element, and whose inner surface is intended to cover the outer surface of the intermediate element, the method being remarkable in that it comprises at least one step of placing at least one brazing sheet, whose melting temperature is lower than that of the other elements of the set, over at least one assembly surface intended to come into contact with another surface of the assembly, and at least one step of heating, by means of a furnace, a set comprising at least one of the outer or inner walls and the intermediate element between which at least one brazing sheet is interposed so as to fix the outer or inner wall by brazing on the intermediate element.

According to other features of the present disclosure, the assembly method includes one or several of the following optional features, considered alone or according to all possible combinations:

a step of placing at least one brazing sheet over all or part of the inner surface of the outer wall;

a step of placing at least one brazing sheet over all or part of the inner surface of the intermediate element;

a step of introducing the intermediate element in the volume delimited by the outer wall in such a manner that the inner surface of the outer wall covers the outer surface of the intermediate element;

a step of introducing an inner wall in the volume delimited by the intermediate element in such a manner that the inner surface of the intermediate element covers the outer surface of the inner wall;

a step of radially expanding the inner wall, by means of a tooling for the expansion of an assembly device, in such a manner that said inner wall comes into contact with and takes the shape of the inner surface of the intermediate element.

The present disclosure also concerns an assembly device for implementing a method such as described above comprising a tooling for the radial expansion by pressure of at least one solid element on the inner wall.

The expansion tooling may comprise a counter-shape presenting a shape substantially complementary to that of the outer wall, being in contact with and covering the outer wall.

The expansion tooling may comprise a hydroforming tool.

The hydroforming tool may comprise a deformable bladder.

The expansion tooling may comprise a hydraulic expansion tool.

The hydraulic expansion tool may comprise at least one solid sector.

The solid sector may be metallic.

The present disclosure also concerns an assembly obtained by a method such as described above comprising the set including the inner wall, the outer wall and the intermediate element.

The assembly may be such that the intermediate element is a honeycomb structure.

The brazing sheets may present a plurality of holes.

The brazing sheets may present a thickness such that the drilling of the different walls to be drilled is neither altered nor complicated.

Advantageously, such a solution allows avoiding the need for using metal brazing toolings and brazing toolings by gas pressure, which cost time and money, not only per se, but also as regards their maintenance, and also, and consequently, allows simplifying the brazing method.

Further areas of applicability will become apparent from the description provided herein. It should be understood that the description and specific examples are intended for purposes of illustration only and are not intended to limit the scope of the present disclosure.

DRAWINGS

In order that the disclosure may be well understood, there will now be described various forms thereof, given by way of example, reference being made to the accompanying drawings, in which.

Figure 1:
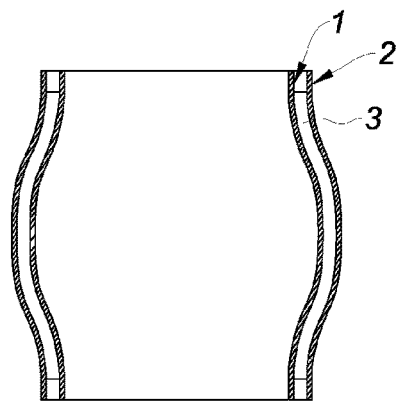
FIG. 1 is a sectional view of an assembly obtained by means of an assembly device according to a first and a second forms of the present disclosure.

The drawings described herein are for illustration purposes only and are not intended to limit the scope of the present disclosure in any way.

DETAILED DESCRIPTION

The following description is merely exemplary in nature and is not intended to limit the present disclosure, application, or uses. It should be understood that throughout the drawings, corresponding reference numerals indicate like or corresponding parts and features.

Referring to FIG. 1, there is described an assembly obtained by an assembly device according to a first and a second forms of the present disclosure.

The assembly consists of an acoustic nozzle comprising a sandwich structure with two shrouded walls, one inner 1 and the other outer 2, between which a honeycomb acoustic structure 3 is interposed.

The inner 1 and outer 2 walls are fixed on the honeycomb structure 3, each by a brazing sheet (not represented) covering respectively, for one, the entire inner surface 4, and for the other, the entire outer surface 5 of the honeycomb structure 3, and intended to be heated up to their melting temperature in a vacuum furnace after assembly in order to connect the inner 1 and outer 2 walls to the honeycomb structure 3. Consequently, the brazing sheets present a melting temperature lower than that of the inner 1 and outer 2 walls and of the honeycomb structure 3.

Figure 2:
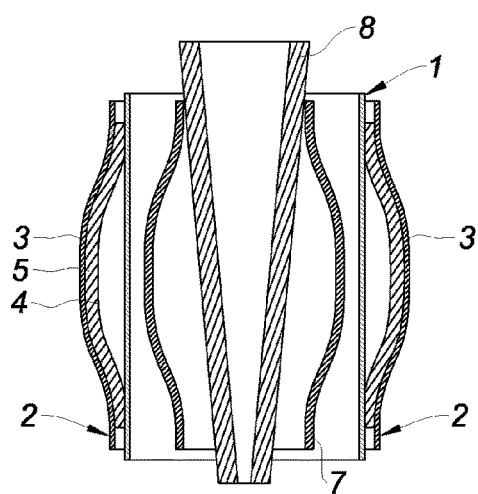
FIG. 2 is a sectional view of an assembly device according to a first form of the present disclosure.
Figure 3:
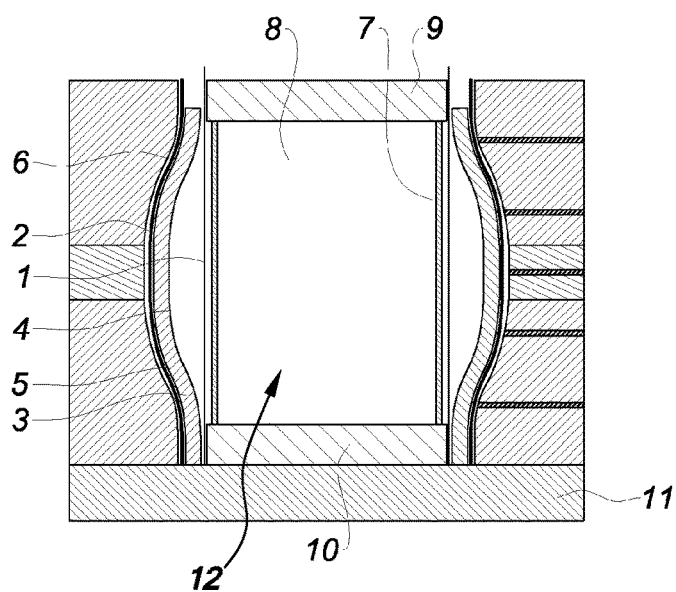
FIG. 3 is a sectional view of an assembly device according to a second form of the present disclosure.

Referring to FIGS. 2 and 3, there are described the common features of the assembly devices according to the first and second forms of the present disclosure.

The assembly devices allow assembling the inner wall 1 in a structure comprising the shrouded outer wall 2 and the honeycomb acoustic structure 3, each presenting substantially circular sections.

The shrouded outer wall 2 presents a shape substantially complementary to that of the inner 4 and outer 5 surfaces of the honeycomb structure 3.

The shrouded outer wall 2 is in contact with and covers the outer surface 4 of the honeycomb structure 3.

The assembly devices comprise a counter-shape 6 (not represented in FIG. 2) presenting a shape substantially complementary to that of the outer wall 2

The counter-shape is in contact with and covers the outer wall 2.

The assembly device comprises a tooling capable of exerting a pressure by contact of a second counter-shape 7 of the tooling on the inner wall 1 in such a manner that said inner wall 1 comes into contact with and takes the shape of the inner surface 5 of the honeycomb structure 3.

The inner surface 5 of the honeycomb structure 3 is covered with a brazing sheet so that, once the assembly is assembled, the brazing sheet is caught between the honeycomb structure 3 and the inner wall 1.

The inner wall 1 is disposed around the second counter-shape 7 of the assembly device. The second counter-shape 7 of the tool serves as an imprint for forming the inner wall 1. This second counter-shape 7 allows giving the inner wall 1 substantially the shape of the inner surface 5 of the honeycomb structure 3.

Referring to FIG. 2, there are described the specific features of the assembly device according to the first form of the present disclosure.

The assembly device according to the first form of the present disclosure is an assembly device by hydraulic expansion.

The second counter-shape 7 is a metallic sector 7 and is actuated by a pylon 8, or expansion core, introduced in the second counter-shape 7. The pylon 8, or expansion core, presents a substantially conical shape and is introduced in the metallic sector 7 in such a manner that the section of the smaller diameter pylon 8 is the first to be introduced in the metallic sector 7. The maximum diameter to be introduced in the metallic sector 7 is chosen in such a manner that the second counter-shape 7 can form the inner wall 1 in a satisfactory manner so as to achieve the assembly.

Referring to FIG. 3, there are described the specific features of the assembly device according to the second form of the present disclosure.

The assembly device according to the second form of the present disclosure comprises an assembly device including a hydroforming tool 12.

The second counter-shape 7 is a deformable bladder 7 and is actuated by a fluid, for example water 8, but which can also be oil. The bladder 7 presents two open ends hermetically clogged by closures 9 and 10.

The closure 10 comes into a plane-on-plane contact with a transverse wall 11 presenting a planar surface, substantially into a plane-on-plane contact with the counter-shape 6.

The closure 9 comprises a device (not represented) for supplying the bladder 7 with water 8.

The closures 9 and 10, as well as the bladder 7, as well as their assembly, are dimensioned in such a manner that the bladder is capable of forming the inner wall 1, in a satisfactory manner, so as to achieve the assembly of the inner wall 1 with the structure comprising the outer wall 2 and the honeycomb structure 3.

It is also possible to form the walls with high pressure of oil (without the bladder 7) with two sealing plugs 9 and 10 presenting toroidal-shaped rubber seals (non represented form).

Referring to FIGS. 1, 2 and 3, there is now described an assembly method according to one form of the present disclosure: according to a first step, a brazing sheet is disposed over the outer wall 2 so as to cover substantially the entire inner surface of the outer wall 2; then, the honeycomb structure 3 is installed inside the outer wall 2 in such a manner that the brazing sheet is substantially entirety pressed against the outer wall 2 and the honeycomb structure 3; then, a brazing sheet is disposed over the inner surface 4 of the honeycomb structure 3 so as to cover the entire inner surface 4; then, the inner wall 1 is introduced in the volume delimited by the honeycomb structure 3; then expanded so as to take the shape of the inner surface 4 of the honeycomb structure 3 and to press the brazing sheet against the inner surface 4.

Finally, once the inner wall 1 is pressed against the inner surface 4 of the honeycomb structure 3, the assembly may be put in the vacuum furnace (not represented) for brazing without tooling, that is to say the assembly is heated up to the melting temperature of the braze, whose value is lower than the melting temperature of the set formed by the inner 1 and outer 2 walls and by the honeycomb structure 3; this operation allows assembling the inner 1 and outer 2 walls to the honeycomb structure 3.

The brazing sheets may present a plurality of holes so that, once the brazing is performed, the braze does not cover neither the entire outer surface of the inner wall 1 nor the entire inner surface of the outer wall 2; thus the acoustic performance will remain satisfactory.

What is claimed is:

1. A method for assembling a set comprising an inner wall, a shrouded outer wall and an intermediate element, each presenting substantially circular sections, the shrouded outer wall presenting a shape substantially complementary to a shape of outer and inner surfaces of the intermediate element, and whose inner surface covers the outer surface of the intermediate element, wherein the method comprises at least one step of placing at least one brazing sheet, whose melting temperature is lower than melting temperatures of other elements of the set, over at least one assembly surface in contact with another assembly surface, at least one step of heating, by means of a furnace and without tooling, a set comprising at least one of the outer or inner wads and the intermediate element between which is interposed at least one brazing sheet so as to fix the outer or inner wall by brazing on the intermediate element, wherein the heating is up to a melting temperature of the brazing sheet and lower than a melting temperature of the at least one outer or inner wall and the intermediate member, and wherein the method comprises a step of radially expanding the inner wall, by means of an expansion tooling of an assembly device, in such a manner that the inner wall comes into contact with and takes the shape of the inner surface of the intermediate element.

2. The method according to claim 1, wherein the method comprises a step of placing at least one brazing sheet over all or part of the inner surface of the outer wall.

3. The method according to claim 1, wherein the method comprises a step of placing at least one brazing sheet over all or part of the inner surface of the intermediate element.

4. The method according to claim 1, wherein the method comprises a step of introducing the intermediate element in a volume delimited by the outer wall in such a manner that the inner surface of the outer wall covers the outer surface of the intermediate element.

5. The method according to claim 1, wherein the method comprises a step of introducing an inner wall in a volume delimited by the intermediate element in such a manner that the inner surface of the intermediate element covers the outer surface of the inner wall.

6. The method according to claim 1, wherein the step of radially expanding the inner wall is achieved by pressure of at least one solid element on the inner wall.

7. The method according to claim 1, wherein the step of radially expanding the inner wall is accomplished by expansion tooling comprising a hydroforming tool.

* * * * *